United States Patent
Fang et al.

(10) Patent No.: US 11,394,977 B2
(45) Date of Patent: Jul. 19, 2022

(54) SAFE AND CROSS DEVICE CONSISTENT VIDEO COMPRESSION

(71) Applicant: Google LLC, Mountain View, CA (US)

(72) Inventors: Daniel Fang, Mountain View, CA (US); Krzysztof Kulewski, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/978,620

(22) PCT Filed: Aug. 26, 2019

(86) PCT No.: PCT/US2019/048192
§ 371 (c)(1),
(2) Date: Sep. 4, 2020

(87) PCT Pub. No.: WO2020/112193
PCT Pub. Date: Jun. 4, 2020

(65) Prior Publication Data
US 2021/0274190 A1  Sep. 2, 2021

Related U.S. Application Data

(60) Provisional application No. 62/771,552, filed on Nov. 26, 2018.

(51) Int. Cl.
*H04N 19/146* (2014.01)
*H04N 19/172* (2014.01)
(Continued)

(52) U.S. Cl.
CPC ......... *H04N 19/146* (2014.11); *H04N 19/166* (2014.11); *H04N 19/172* (2014.11); *H04N 19/184* (2014.11)

(58) Field of Classification Search
CPC ...... H04N 19/00; H04N 19/40; H04N 19/176; H04N 19/146; H04N 19/184
See application file for complete search history.

(56) References Cited

U.S. PATENT DOCUMENTS

| 6,757,333 B2 | 6/2004 | Saunders et al. |
| 8,767,825 B1 * | 7/2014 | Wang ................... H04N 19/172 375/240.1 |

(Continued)

FOREIGN PATENT DOCUMENTS

| JP | 2002232882 | 8/2002 |
| JP | 2004-289867 | 10/2004 |

(Continued)

OTHER PUBLICATIONS

EPO, International Search Report for International Patent Application No. PCT/US2019/048192, dated Nov. 8, 2019, 4 pages.

(Continued)

*Primary Examiner* — Kyle M Lotfi
(74) *Attorney, Agent, or Firm* — IP Spring

(57) ABSTRACT

A method generates a compressed video that is consistent across different devices. The method comprises identifying an output bitrate. The method further comprises parsing parameters of an input video. The method further comprises generating a blank video with a fixed duration based on the parameters of the input video. The method further comprises generating a representative video based on providing the blank video as input to a decoder. The method further comprises determining a request bitrate for the representative video and the output bitrate. The method further comprises compressing the input video using the request bitrate to generate an actual video.

20 Claims, 4 Drawing Sheets

(51) Int. Cl.
*H04N 19/184* (2014.01)
*H04N 19/166* (2014.01)

(56) References Cited

U.S. PATENT DOCUMENTS

| | | | | |
|---|---|---|---|---|
| 10,666,941 | B1* | 5/2020 | Doron | .................. H04L 65/607 |
| 2002/0131492 | A1 | 9/2002 | Yokoyama | |
| 2009/0202164 | A1* | 8/2009 | Rossato | ............... H04N 19/136 |
| | | | | 382/238 |
| 2016/0248474 | A1* | 8/2016 | Gilson | ................... H04N 19/12 |
| 2016/0295256 | A1* | 10/2016 | Sharma | .............. H04N 21/2187 |
| 2018/0295371 | A1* | 10/2018 | Jiang | .................... H04N 19/184 |

FOREIGN PATENT DOCUMENTS

| | | |
|---|---|---|
| JP | 2010-233119 | 10/2010 |
| KR | 1020070037695 | 4/2007 |
| KR | 1020180054717 | 5/2018 |
| WO | 2017/127213 | 7/2017 |

OTHER PUBLICATIONS

EPO, Written Opinion for International Patent Application No. PCT/US2019/048192, dated Nov. 8, 2019, 8 pages.
International Bureau, International Preliminary Report on Patentability for International Patent Application No. PCT/US2019/048192, dated May 25, 2021, 9 pages.
IPO, First Examination Report for Indian Patent Application No. 202047037815, dated Nov. 24, 2021, 6 pages.
KIPO, Office Action (with English translation) for Korean Patent Application No. 10-2020-7025487, dated Jan. 8, 2022, 6 pages.
JPO, Office Action (with English translation) for Japanese Patent Application No. 2020-546478, dated Feb. 8, 2022, 7 pages.
EPO, Communication Pursuant to Article 94(3) EPC for European Patent Application No. 19765881.8, dated Apr. 7, 2022, 5 pages.
KIPO, Notice of Allowance (with English translation) for Korean Patent Application No. 10-2020-7025487, dated Apr. 15, 2022, 3 pages.

* cited by examiner

US 11,394,977 B2

SAFE AND CROSS DEVICE CONSISTENT VIDEO COMPRESSION

CROSS-REFERENCE TO RELATED APPLICATIONS

The present application is a U.S. National Phase application of International Patent Application No. PCT/US2019/048192, filed Aug. 26, 2019 and titled SAFE AND CROSS DEVICE CONSISTENT VIDEO COMPRESSION, which claims priority to U.S. Provisional Patent Application No. 62/771,552, filed Nov. 26, 2018 and titled SAFE AND CROSS DEVICE CONSISTENT VIDEO COMPRESSION, the entire contents of both of which are incorporated herein by reference in their entirety.

BACKGROUND

The specification relates to a video application that generates compressed videos that are consistent across different device platforms.

People all around the world capture millions of videos every day. By encoding videos every nth fraction of a second, video files are large. For example, a one-minute video with encoding at 16 megabits (Mbits) per second is 120 megabytes (MB). Videos are often captured in markets or conditions where storing or transferring large files is impractical or cost prohibitive. For example, where the devices use 2G cellular connections or where the device storage is very limited. Possible solutions to the problem include video compression to smaller compressed output bitrates.

However, video compression is problematic because, when software decoders and encoders are used, the device video compression can be slow, contain errors, or have inconsistent bitrates. The error may be, for example, a green line in the video. The bitrate may be different for devices manufactured by different companies producing different bitrates for the same input. In addition to variability, it is disadvantageous to produce compressed videos of smaller sizes because a size of the video is correlated with its quality.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

A method generates a compressed video that is consistent across different devices. The method comprises identifying an output bitrate. The method comprises identifying an output bitrate. The method further comprises parsing parameters of an input video. The method further comprises generating a blank video with a fixed duration based on the parameters of the input video. The method further comprises generating a representative video based on providing the blank video as input to a decoder. The method further comprises determining a request bitrate for the representative video and the output bitrate. The method further comprises compressing the input video using the request bitrate to generate an actual video.

In some embodiments, generating the representative video includes generating a geometric texture on top of the representative video, determining the request bitrate includes comparing a representative bitrate of the representative video to the output bitrate, and compressing the input video results in the actual video having an actual width, an actual height, and an actual bitrate. In some embodiments, identifying the output bitrate further includes identifying an output width and an output height. The operations may further include verifying the actual video by confirming that: (a) the actual width and the actual height are within a threshold width value and a threshold height value of the output width and the output height and (b) a number of frames of the actual video are a same number as the number of frames of the input video. The operations may further include verifying the actual video by confirming that the actual bitrate of the actual video is within a threshold bitrate value of the output bitrate and responsive to determining that the actual bitrate is not within the threshold bitrate value, modifying the parameters and requesting that the input video be compressed with the output width and the output height based on modified parameters. In some embodiments, identifying the output bitrate further includes identifying an output width and an output height and the input video is further compressed using the output width and the output height. In some embodiments, the output bitrate, the output width, and the output height are specified by a user or are default values. In some embodiments, compressing the input video includes adding one or more audio streams to the actual video and the method further comprises verifying the actual video by comparing the input video to the actual video to confirm that the actual video includes the one or more audio streams and responsive to the actual video failing to include the one or more audio streams, determining that the actual video failed. The operations may further include verifying the actual video by confirming that the output width multiplied by the output height is equal to a common resolution and responsive to the output width multiplied by the output height failing to equal the common resolution, using a higher bitrate to compress the input video. The operations may further include requesting that the input video be compressed includes merging metadata from the input video include the actual video. The operations may further include verifying the actual video by comparing input video image frames to actual video image frames by: given two images, S and T, both of size (x, y) containing c channels, where each channel value is represented as a floating point number between 0.0 and 1.0, the difference(x, y) is equal to a sum of all channels $(S(x, y, channel) - T(x, y, channel))^2$, filtered_difference(x, y)=difference(x, y) if it is above threshold 1 or 0 otherwise, column(x)=sum for all values y of filtered_difference(x, y)/height of the image, row(y)=sum for all values of x of filtered_difference(x, y)/width of the image, and an error=maximum of all column (x) and row(y) computed above.

In some embodiments, a non-transitory computer-readable medium with instructions stored thereon that, when executed by one or more computers, cause the one or more computers to generate a compressed video that is consistent across different devices by performing operations, the operations comprising: identifying an output bitrate, parsing parameters of an input video, generating a blank video with a fixed duration based on the parameters of the input video, generating a representative video based on providing the blank video as input to a decoder, determining a request bitrate for the representative video and the output bitrate, and compressing the input video using the request bitrate to generate an actual video.

In some embodiments, generating the representative video includes generating a geometric texture on top of the representative video, determining the request bitrate includes comparing a representative bitrate of the representative video to the output bitrate, and compressing the input video results in the actual video having an actual width, an actual height, and an actual bitrate. In some embodiments, identifying the output bitrate further includes identifying an output width and an output height. The operations may further include verifying the actual video by confirming that: (a) the actual width and the actual height are within a threshold width value and a threshold height value of the output width and the output height and (b) a number of frames of the actual video are a same number as the number of frames of the input video. The operations may further include verifying the actual video by confirming that the actual bitrate of the actual video is within a threshold bitrate value of the output bitrate and responsive to determining that the actual bitrate is not within the threshold bitrate value, modifying the parameters and requesting that the input video be compressed with the output width and the output height based on modified parameters. In some embodiments, identifying the output bitrate further includes identifying an output width and an output height and the input video is further compressed using the output width and the output height.

In some embodiments, a system generates a compressed video that is consistent across different devices, the system comprising: one or more processors and a memory that stores instructions that, when executed by the one or more processors cause the one or more processors to perform operations comprising: identifying an output bitrate, parsing parameters of an input video, generating a blank video with a fixed duration based on the parameters of the input video, generating a representative video based on providing the blank video as input to a decoder, determining a request bitrate for the representative video and the output bitrate, and compressing the input video using the request bitrate to generate an actual video.

In some embodiments, generating the representative video includes generating a geometric texture on top of the representative video, determining the request bitrate includes comparing a representative bitrate of the representative video to the output bitrate, and compressing the input video results in the actual video having an actual width, an actual height, and an actual bitrate. In some embodiments, identifying the output bitrate further includes identifying an output width and an output height. The operations may further include verifying the actual video by confirming that: (a) the actual width and the actual height are within a threshold width value and a threshold height value of the output width and the output height and (b) a number of frames of the actual video are a same number as the number of frames of the input video. The operations may further include verifying the actual video by confirming that the actual bitrate of the actual video is within a threshold bitrate value of the output bitrate and responsive to determining that the actual bitrate is not within the threshold bitrate value, modifying the parameters and requesting that the input video be compressed with the output width and the output height based on modified parameters. In some embodiments, identifying the output bitrate further includes identifying an output width and an output height and the input video is further compressed using the output width and the output height.

The various embodiments described below advantageously describe a way to generate compressed videos that have a similar resolution and a similar bitrate independent of the device that receives the video.

BRIEF DESCRIPTION OF THE DRAWINGS

The disclosure is illustrated by way of example, and not by way of limitation in the FIGS. of the accompanying drawings in which like reference numerals are used to refer to similar elements.

DETAILED DESCRIPTION

A video application may receive a request to compress an input video to generate an output video (hereafter referred to as an "actual video"). The request includes a request bitrate, which is used to obtain an actual bitrate of the actual video. The request bitrate may be different from the actual bitrate of the actual video, but is provided to the encoder because it results in the actual video having the actual bitrate. As a result of the process described below, the video application generates compressed videos that are consistent because they have a similar resolution and a similar bitrate independent of the device that receives the video.

In some embodiments, the video application parses parameters of an input video, the parameters including an input width, an input height, and an input format. The video application generates a blank video with a fixed duration based on the parameters of the input video. The video application provides a blank video as input to a decoder and the decoder outputs a representative video. The video application uses the parameters from the representative video (e.g., a specified output width and output height) to compress the input video, resulting in an actual video that has an actual width and an actual height.

Example System

Figure 1:
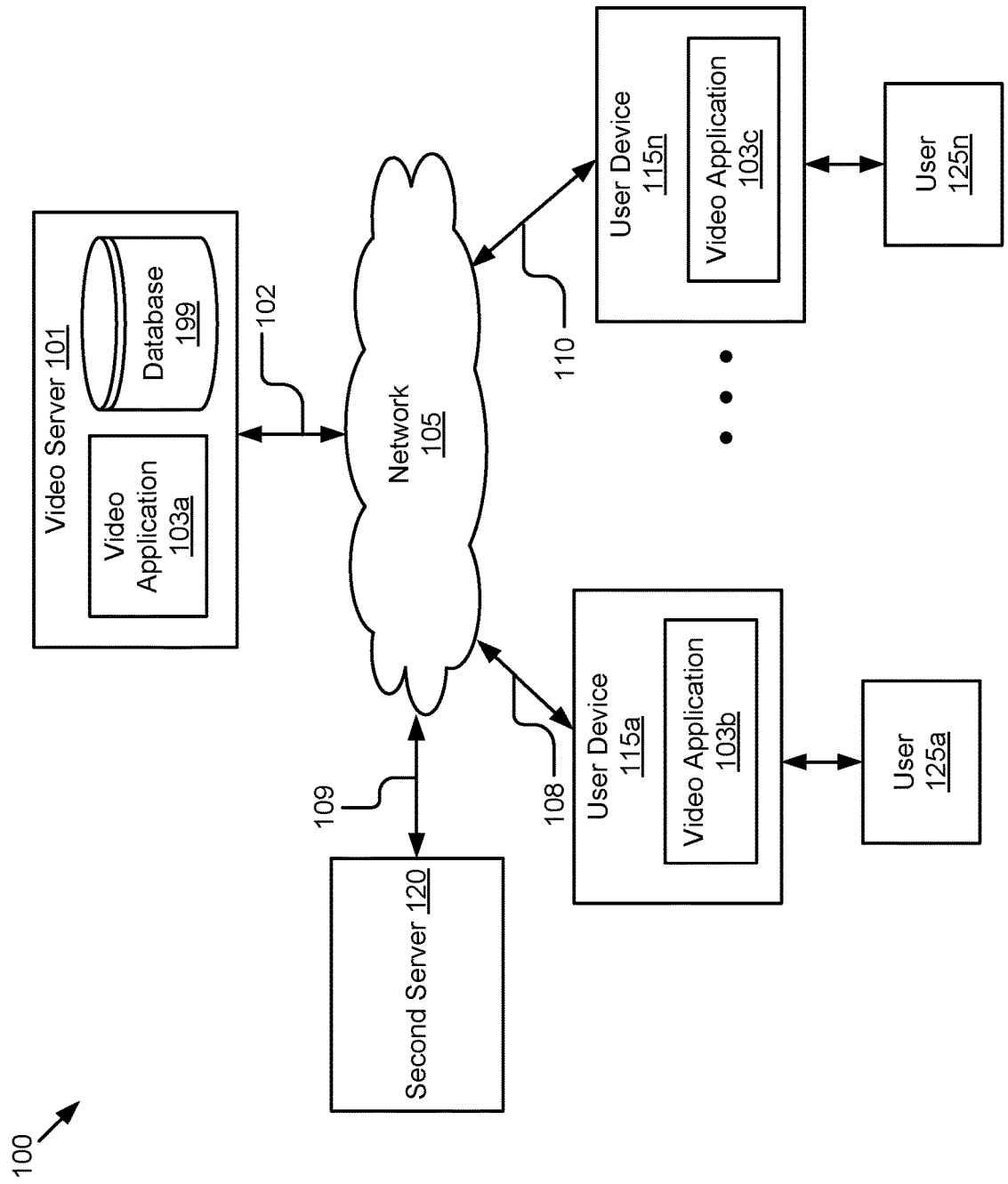
FIG. 1 illustrates a block diagram of an example system that generates a compressed video according to some embodiments.

FIG. 1 illustrates a block diagram of an example system 100 that generates compressed videos. The illustrated system 100 includes a video server 101, a user device 115*a*, a user device 115*n*, a second server 120, and a network 105. The user 125*a* may be associated with the user device 115*a* and the user 125*n* may be associated with the user device 115*n*. In some embodiments, the system 100 may include other servers or devices not shown in FIG. 1. In FIG. 1 and the remaining FIGS., a letter after a reference number, e.g., "103*a*," represents a reference to the element having that particular reference number. A reference number in the text without a following letter, e.g., "103," represents a general reference to embodiments of the element bearing that reference number. Although only one video server 101, one user device 115*a*, one user device 115*n*, one second server 120, and one network 105 are illustrated in FIG. 1, persons of ordinary skill in the art will recognize that FIG. 1 may include one or more video servers 101, one or more user devices 115*a*, one or more user devices 115*n*, one or more second servers 120, and one or more networks 105.

The video server 101 may include a processor, a memory, and network communication capabilities. In some embodiments, the video server 101 is a hardware server. The video server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the video server 101 sends and receives data to and from one or more of the user device 115a, the user device 115n, and the second server 120 via the network 105. The video server 101 may include a video application 103a and a database 199.

The video application 103a may be code and routines operable to provide compressed videos to the user devices 115a, 115n. In some embodiments, the video application 103a receives an input video, for example, from the database 199 on the video server 101 or from the second server 120. The video application 103a may calibrate the input video, compress the input video into a compressed video, and verify that the compressed video has expected attributes. For example, the video application 103a may confirm that the compressed video has a resolution and a bitrate that conform to a resolution and bitrate provided as default values or by a user. Compressing the input video may include copying metadata from the input video and add it to the compressed video.

In some embodiments, the video application 103a may be implemented using hardware including a field-programmable gate array (FPGA) or an application-specific integrated circuit (ASIC). In some embodiments, the video application 103a may be implemented using a combination of hardware and software.

The database 199 may store input videos, blank videos, representative videos, and actual video. The database 199 may also store social network data associated with the users 125a, 125n, user preferences for the user 125a and/or the user 125n, etc.

The user device 115a may be a computing device that includes a memory and a hardware processor. For example, the user device 115a may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, the user device 115a is coupled to the network 105 via signal line 108 and the user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. The user device 115a is accessed by a user 125a and the user device 115n is accessed by a user 125n.

In some embodiments, the user device 115a is included in a wearable device worn by the user 125a. For example, the user device 115a is included as part of a clip (e.g., a wristband), part of jewelry, or part of a pair of glasses. In another example, the user device 115a can be a smart watch. The user 125a may view data associated with the video application 103 on a display of the device worn by the user 125a. For example, the video application 103a may display actual videos on a display of a smart watch or a smart wristband.

In some embodiments, video application 103b may be stored on a user device 115a. The video application 103b may be operable to receive the actual video from the video server 101 and display the actual video on a display of the user device 115a.

The user device 115n may be a computing device that includes a memory and a hardware processor. For example, the user device 115n may include a desktop computer, a mobile device, a tablet computer, a mobile telephone, a wearable device, a head-mounted display, a mobile email device, a portable game player, a portable music player, a reader device, or another electronic device capable of accessing a network 105.

In some embodiments, the user device 115n includes a video application 103c. The video application 103c may be operable to receive the actual video and display the actual video on a display of the user device 115n. The actual video displayed on the user device 115n may have the same resolution and size as the actual video displayed on the user device 115a.

The second server 120 may include a processor, a memory, and network communication capabilities. The second server 120 may access the network 105 via signal line 109. The second server 120 may provide services to the video server 101, the user device 115a, and/or the user device 115n. For example, the second server 120 may generate input videos and provide the input videos to the video server 101 for compression.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, wireless local area network (WLAN) computer communication specified by IEEE 802.11, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the video server 101, in practice one or more networks 105 may be coupled to these entities.

Example Device

Figure 2:
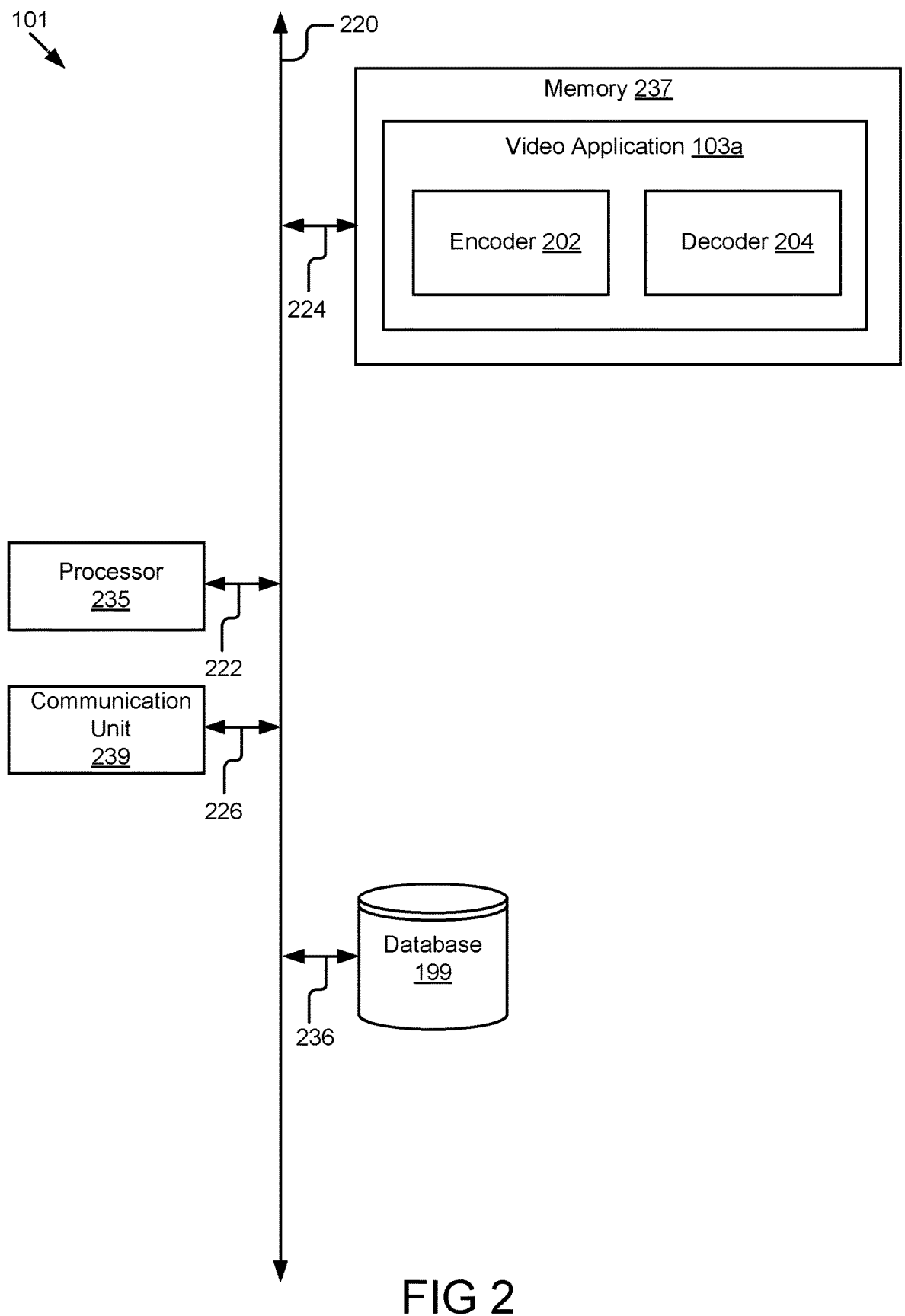
FIG. 2 illustrated a block diagram of an example device that generates a compressed video according to some embodiments.

FIG. 2 illustrates a block diagram of an example video server 101 that generates compressed videos according to some embodiments. Although FIG. 2 is illustrated as being a video server 101, some or all of the functions may be performed by the user devices 115a, 115n in whole or in part. The video server 101 may include a processor 235, a memory 237, a communication unit 239, and a database 199. Additional components may be present or some of the previous components may be omitted depending on whether the steps are all performed by the video server 101 or the user device 115.

The video server 101 may store the video application 103a in the memory 237. In embodiments where the video server 101 is a wearable device, the video server 101 may not include database 199. In some embodiments, the video server 101 may include other components not listed here, such as a battery, etc. The components of the video server 101 may be communicatively coupled by a bus 220.

The processor 235 includes an arithmetic logic unit, a microprocessor, a general purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the user device 115a. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the video application 103, which is described in greater detail below. The memory 237 is coupled to the bus 220 for communication with the other components via signal line 224.

The communication unit 239 transmits and receives data to and from at least one of the user device 115a and the video server 101 depending upon where the video application 103 may be stored. In some embodiments, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115a or the video server 101, depending on where the video application 103 may be stored. In some embodiments, the communication unit 239 includes a wireless transceiver for exchanging data with the user device 115a, video server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The database 199 may be a non-transitory computer-readable storage medium that stores data that provides the functionality described above with reference to FIG. 1. The database 199 may be a DRAM device, a SRAM device, flash memory or some other memory device. In some embodiments, the database 199 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The database 199 is coupled to the bus 220 for communication with the other components via signal line 236.

The video application 103a may include an encoder 202 and a decoder 204.

The encoder 202 may include code and routines for encoding a video through compression. In some embodiments, the encoder 202 includes a set of instructions executable by the processor 235 to encode the video. In some embodiments, the encoder is stored in the memory 237 of the video server 101 and is accessible and executable by the processor 235.

In some embodiments, the encoder 202 calibrates an input video, compresses the input video into a compressed video, adds metadata from the input video to the compressed video, and verifies that the compressed video has proper attributes.

The encoder 202 may receive an input video V(I) of resolution W(I)×H(I) and bitrate B(I). The goal is to compress the input video V(I) to generate an actual video based on resolution W(O)×H(O) and output bitrate B(O). In some embodiments, resolution W(O)×H(O) are specified by a user or a default resolution based on the goal of having an output video V(O) with a reduced file size. To reduce the file size of the actual video as compared to the input video, W(O)×H(O) have to be smaller than W(I)×H(I) and/or B(O) has to be smaller than B(I).

The encoder 202 performs calibration by solving the following problem. Compression of the input video requires asking the encoder 202 to perform video compression and generate output bitrate B(O). However, the encoder 202 generates bitrate B(X), which can be substantially different than the output bitrate B(O). As a result, the encoder performs calibration to determine what request bitrate B(Y) should be requested in order to achieve a bitrate as close as possible to the output bitrate B(O).

As a result, the encoder 202 parses the parameters of the input video V(I). Because the request bitrate B(Y) drastically changes based on the input width W(I), the input height H(I), the input format, and the input frame rate F(I) of the input video V(I), these parameters are useful for calibration.

The encoder 202 generates a representative blank video V(B) with a fixed duration D(B) using the W(I), H(I), frame rate F(I), and the format of the input video. The fixed duration D(B) is chosen such that this step can be performed quickly, but is not too short. For example, the fixed duration D(B) may be between 2-12 seconds. Encoders tend to optimize shorter videos leading to incorrect calibrations. In some embodiments, the encoder 202 generates a blank video by rendering frames with no images, e.g., black frames, with frame rate F(I)×fixed duration D(B) because the blank video can be generated very quickly and with a tiny file size.

The encoder 202 generates a representative video V(P) using the blank video V(B) as input to the decoder 204. Decoders and encoders are often paired such that a valid input video is required to generate a representative video. A graphics framework, such as OpenGL is used to generate a geometric texture on top of the representative video V(P). The texture changes colors frame by frame, mimicking the contents of a real video. After generation, the representative video's V(P)'s bitrate can be compared to the output bitrate B(O) to determine the request bitrate B(Y).

The encoder 202 requests the input video V(I) to be compressed to W(O)×H(O) with request bitrate B(Y), which was determined in the previous step, to get actual video V(A) with resolution width W(A)×height H(A) and actual bitrate B(A). The encoder 202 may also copy audio streams in this step.

The encoder 202 performs verification by comparing the input video I(V) with the actual video V(A). In some embodiments, the encoder 202 determines whether the actual width and the actual height are within a threshold width value and a threshold height value of the output width and the output height. If the actual width and the actual height are not within the threshold width value, the encoder 202 may determine that the compression process failed. In some embodiments, the encoder 202 determines whether a number of frames of the actual video are a same number as the number of frames of the input video. If the number of frames of the actual video are not the same number as the number of frames of the input video, the encoder 202 may determine that the compression process failed.

In some embodiments, the encoder 202 verifies the actual video by confirming that the actual bitrate of the actual video is within a threshold bitrate value of the output bitrate. If the actual bitrate is not within the threshold bitrate value, the encoder 202 may modify the parameters and requesting that the input video be compressed with the output width and the output height based on modified parameters. For example, the encoder 202 may use a longer fixed duration for the representative video.

In instances where the encoder 202 added or attempted to add one or more audio streams to the actual video, the encoder 202 may compare the input video to the actual video to confirm that the actual video includes the one or more audio streams. If the actual video fails to include the one or more audio streams, the encoder 202 may determine that the actual video failed to have the resolution and bitrate that were specified at the beginning of the process. For example, the resolution and the bitrate may be default values or specified by a user.

In some embodiments, the encoder 202 may compare the input video to the actual video to confirm that the output width multiplied by the output height is equal to a common resolution. The encoder 202 may perform this comparison on all frames or a subset of frames. If the output width multiplied by the output height fails to equal the common resolution, the encoder 202 may use a higher bitrate to compress the input video. The encoder 202 may generate a new actual video and confirm whether the new actual video satisfies the verification step.

Many encoders encode video formats in a way where the video consists of frames of two or more different types: key frames and delta frames. A key frame is a full representation of the image in the frame and does not depend on previous frames. Conversely, delta frames encode the different between a current frame and a previous frame.

In situations where the encoder compares only a subset of frames, to save time the encoder 202 skips rendering of certain frames. However, the key frames for the input video and the actual video may be located in different positions. As a result, in some embodiments, the encoder 202 determines, for each frame to be compared, a closest key frame before that in both the input video and the actual video and ensures that the decoder 204 decodes the key frame and all delta frames after it, before reaching the frame that is needed for the comparison.

The encoder 202 may use different techniques to compare an actual image in the frames. Because there are common errors associated with the comparison, and one in particular is that a line in the video, such as a left edge of the video is discolored, the encoder 202 may perform the following comparison:

Given two images, S and T, both of size (x, y) containing c channels, where each channel value is represented as a floating point number between 0.0 and 1.0, the encoder 202 computes:

the difference$(x,y)$ as equal to the sum of all channels$(S(x,y,\text{channel})-T(x,y,\text{channel}))^2$ filtered_difference$(x,y)$=difference$(x,y)$ if it is above threshold 1 or 0 otherwise column$(x)$=sum for all values $y$ of filtered_difference$(x,y)$/height of the image row$(y)$=sum for all values of $x$ of filtered_difference$(x,y)$/width of the image error=maximum of all column$(x)$ and row$(y)$ computed above.

We determine if the images are similar enough by comparing the error with a threshold value.

The encoder 202 may perform metadata copying. When the input video is compressed it can lose some extra metadata, e.g., creation time. The encoder 202 may correct the actual video by merging it into all the required metadata from the input video. For example, for creation time, if the input file is an MP4 file, it may consist of copying creation time from MVHD, TKHD, and MDHD atoms from the input video to create the actual video.

The decoder 204 may include code and routines for decoding a video. In some embodiments, the decoder 204 includes a set of instructions executable by the processor 235 to decode the video. In some embodiments, the decoder is stored in the memory 237 of the video server 101 and is accessible and executable by the processor 235.

In some embodiments, the decoder 204 receives a blank video V(B) from the encoder 202, decodes the blank video, and provides parameters associated with the decoded blank video to the encoder 202.

Example Methods

Figure 3:
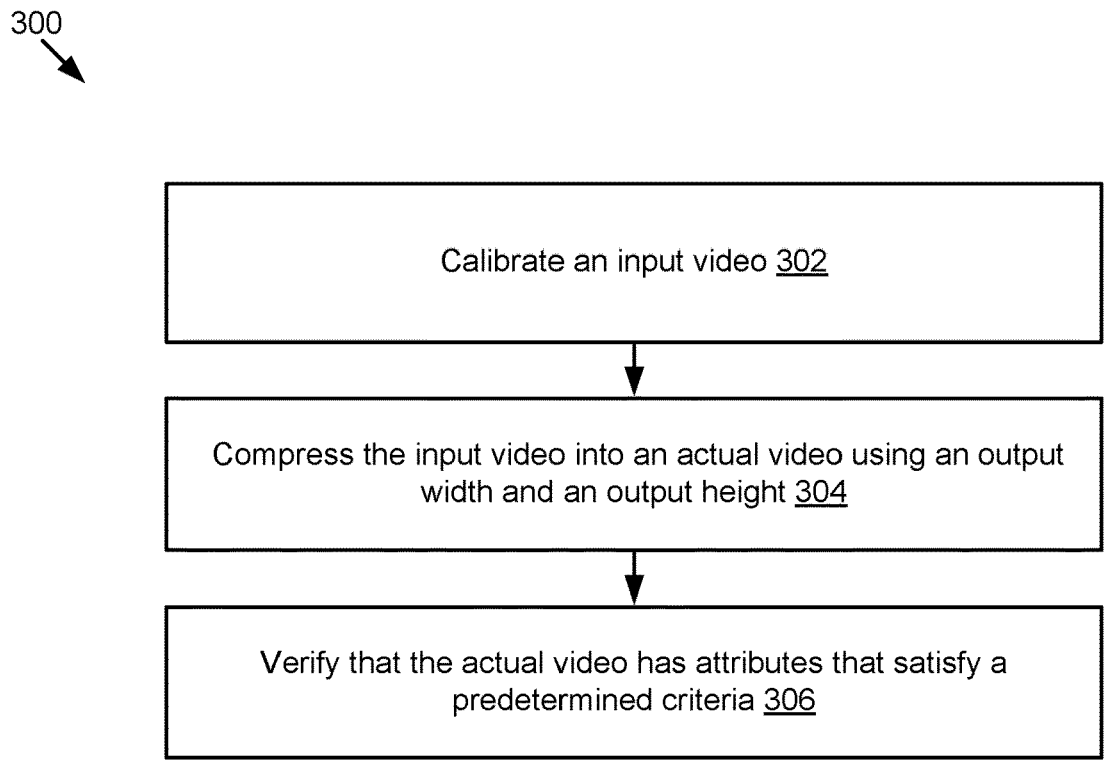
FIG. 3 illustrates a flowchart of another example method to generate a compressed video according to some embodiments.

FIG. 3 illustrates a flowchart of an example method 300 to generate compressed videos according to some embodiments. The method 300 is performed by any combination of a video application 103a stored on a video server 101 and a video application 103b stored on a user device 115a of FIG. 1.

At step 302, an input video is calibrated. For example, the encoder 202 performs calibration to determine what request bitrate B(Y) should be provided to the encoder 202 with a request to compress the input video to generate the actual video in order to achieve a bitrate that is as close as possible to an output bitrate B(O).

At step 304, the input video is compressed into an actual video using an output width and an output height. In some embodiments, requesting that the input video be compressed to the actual video results in an actual video with an actual width, an actual height, and an actual bitrate. If the calibration process worked well, the actual video should have a similar resolution (e.g., actual width and actual height) to the input video.

At step 306, it is verified that the actual video has attributes that satisfy predetermined criteria. For example, verification includes confirming that the actual width and the actual height are within a threshold width value and a threshold height value of the output width and the output height. If the actual width and the actual height are not within the threshold width value and the threshold height value, it is determined that the compression failed.

Figure 4:
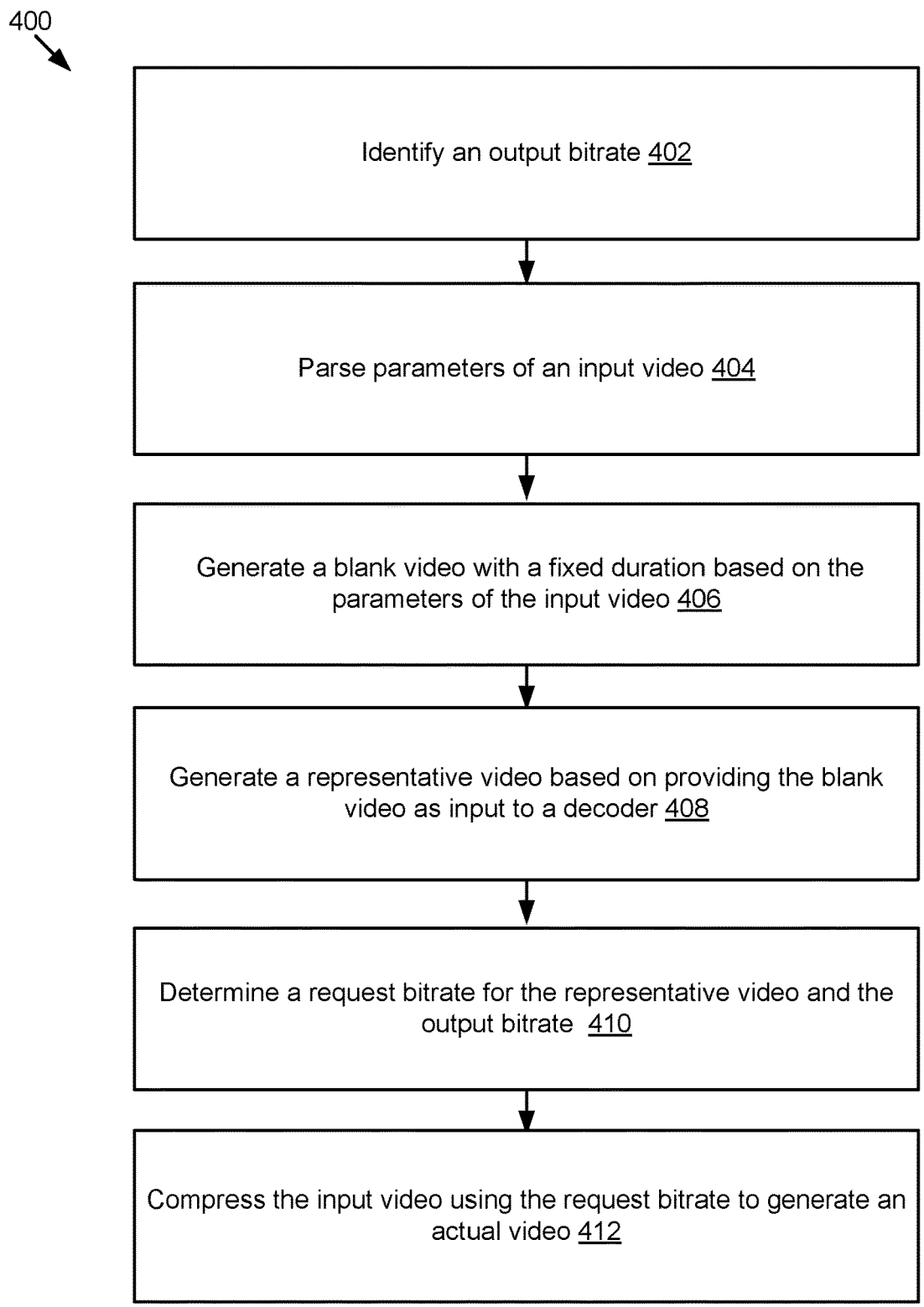
FIG. 4 illustrates a flowchart of another example method to generate a compressed video according to some embodiments.

FIG. 4 illustrates a flowchart of another example method 400 to generate a compressed video according to some embodiments. The method 400 is performed by any combination of a video application 103*a* stored on a video server 101 and a video application 103*b* stored on a user device 115*a* of FIG. 1.

At step 402, an output bitrate is identified. The output bitrate may be specified by a user or a default value. An output width and an output height may also be identified. At step 404, parameters of an input video are parsed. The parameters may include an input width, an input height, and an input format. At step 406, a blank video is generated with a fixed duration based on the parameters of the input video. At step 408, a representative video is generated based on providing the blank video as input to a decoder 204. For example, the decoder 204 decodes the blank video and outputs a representative video with a representative bitrate.

At step 410, a request bitrate is determined based on the representative video and the output bitrate. For example, the request bitrate may be determined by comparing a representative bitrate of the representative video to the output bitrate. At step 412, the input video is compressed using the request bitrate to generate an actual video (i.e., the output video with the output bitrate). In some embodiments, the input video may be further compressed using an output width and an output height.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A method that generates a compressed video that is consistent across different devices, the method comprising:
    identifying an output bitrate;
    parsing parameters of an input video;
    generating a blank video with a fixed duration based on the parameters of the input video;
    generating a representative video based on providing the blank video as input to a decoder and generating a geometric texture on top of the representative video;
    determining a request bitrate for the representative video and the output bitrate by comparing a representative bitrate of the representative video to the output bitrate; and
    providing the request bitrate to an encoder for compression of the input video by the encoder to generate an actual video, wherein the compression results in the actual video having an actual width, an actual height, and an actual bitrate.

2. The method of claim 1, wherein the blank video includes black frames.

3. The method of claim 1, wherein identifying the output bitrate further includes identifying an output width and an output height and further comprising:
    verifying the actual video by confirming that:
        (a) the actual width and the actual height are within a threshold width value and a threshold height value of the output width and the output height; and
        (b) a number of frames of the actual video are a same number as the number of frames of the input video.

4. The method of claim 1, wherein identifying the output bitrate further includes identifying an output width and an output height and further comprising:
    verifying the actual video by confirming that the actual bitrate of the actual video is within a threshold bitrate value of the output bitrate; and
    responsive to determining that the actual bitrate is not within the threshold bitrate value, modifying the parameters and requesting that the input video be compressed with the output width and the output height based on modified parameters.

5. The method of claim 1, wherein:
    identifying the output bitrate further includes identifying an output width and an output height; and
    the input video is further compressed using the output width and the output height.

6. The method of claim 5, wherein the output bitrate, the output width, and the output height are specified by a user or are default values.

7. The method of claim 1, wherein compressing the input video includes adding one or more audio streams to the actual video and further comprising:
    verifying the actual video by comparing the input video to the actual video to confirm that the actual video includes the one or more audio streams; and
    responsive to the actual video failing to include the one or more audio streams, determining that the actual video failed.

8. The method of claim 1, wherein identifying the output bitrate further includes identifying an output width and an output height and further comprising:
    verifying the actual video by confirming that the output width multiplied by the output height is equal to a resolution associated with the actual video; and
    responsive to the output width multiplied by the output height failing to equal the resolution, using a higher bitrate to compress the input video.

9. The method of claim 1, wherein compressing the input video includes merging metadata from the input video to generate the actual video.

10. The method of claim 1, further comprising:
    verifying the actual video by comparing input video image frames to actual video image frames by: given two images, S and T, both of size (x, y) containing c channels, where each channel value is represented as a floating point number between 0.0 and 1.0, the difference(x, y) is equal to a sum of all channels $(S(x, y, channel) - T(x, y, channel))^2$, filtered_difference(x, y)=difference(x, y) if it is above threshold 1 or 0 otherwise, column(x)=sum for all values y of filtered_difference(x, y)/ height of the image, row(y)=sum for all values of x of filtered difference(x, y)/ width of the image, and an error=maximum of all column(x) and row(y) computed above.

11. A non-transitory computer-readable medium with instructions stored thereon that, when executed by one or more computers, cause the one or more computers to generate a compressed video that is consistent across different devices by performing operations, the operations comprising:
    identifying an output bitrate;
    parsing parameters of an input video;
    generating a blank video with a fixed duration based on the parameters of the input video;
    generating a representative video based on providing the blank video as input to a decoder and generating a geometric texture on top of the representative video;
    determining a request bitrate for the representative video and the output bitrate by comparing a representative bitrate of the representative video to the output bitrate; and
    providing the request bitrate to an encoder for compression of the input video by the encoder to generate an actual video, wherein the compression results in the actual video having an actual width, an actual height, and an actual bitrate.

12. The computer-readable medium of claim 11, wherein the blank video contains no images.

13. The computer-readable medium of claim 11, wherein identifying the output bitrate further includes identifying an output width and an output height and further comprising:
    verifying the actual video by confirming that:
        (a) the actual width and the actual height are within a threshold width value and a threshold height value of the output width and the output height; and
        (b) a number of frames of the actual video are a same number as the number of frames of the input video.

14. The computer-readable medium of claim 11, wherein identifying the output bitrate further includes identifying an output width and an output height and further comprising:
    verifying the actual video by confirming that the actual bitrate of the actual video is within a threshold bitrate value of the output bitrate; and
    responsive to determining that the actual bitrate is not within the threshold bitrate value, modifying the parameters and requesting that the input video be compressed with the output width and the output height based on modified parameters.

15. The computer-readable medium of claim 11, wherein:
    identifying the output bitrate further includes identifying an output width and an output height; and
    the input video is further compressed using the output width and the output height.

16. A system that generates a compressed video that is consistent across different devices, the system comprising:
- one or more processors; and
- a memory coupled to the one or more processors that stores instructions that, when executed by the one or more processors cause the one or more processors to perform operations comprising:
    - identifying an output bitrate;
    - parsing parameters of an input video;
    - generating a blank video with a fixed duration based on the parameters of the input video;
    - generating a representative video based on providing the blank video as input to a decoder and generating a geometric texture on top of the representative video;
    - determining a request bitrate for the representative video and the output bitrate by comparing a representative bitrate of the representative video to the output bitrate; and
    - providing the request bitrate to an encoder for compression of the input video by the encoder to generate an actual video, wherein the compression results in the actual video having an actual width, an actual height, and an actual bitrate.

17. The system of claim 16, wherein the blank video includes black frames.

18. The system of claim 16, wherein identifying the output bitrate further includes identifying an output width and an output height and further comprising:
- verifying the actual video by confirming that:
    - (a) the actual width and the actual height are within a threshold width value and a threshold height value of the output width and the output height; and
    - (b) a number of frames of the actual video are a same number as the number of frames of the input video.

19. The system of claim 16, wherein identifying the output bitrate further includes identifying an output width and an output height and further comprising:
- verifying the actual video by confirming that the actual bitrate of the actual video is within a threshold bitrate value of the output bitrate; and
- responsive to determining that the actual bitrate is not within the threshold bitrate value, modifying the parameters and requesting that the input video be compressed with the output width and the output height based on modified parameters.

20. The system of claim 16, wherein:
- identifying the output bitrate further includes identifying an output width and an output height; and
- the input video is further compressed using the output width and the output height.

* * * * *